United States Patent
Cea et al.

(10) Patent No.: US 9,078,467 B2
(45) Date of Patent: Jul. 14, 2015

(54) PROCESS TO ENHANCE FLAVOR OF ROASTED NUTS AND PRODUCTS WITH MODIFIED TEXTURE

(75) Inventors: Theresa R. Cea, Brooklyn, NY (US); Jan Karwowski, Midland Park, NJ (US); Chen Y. Wang, Morris Plains, NJ (US); Don C. Winfrey, Tobyhanna, PA (US)

(73) Assignee: Kraft Foods Group Brands LLC, Northfield, IL (US)

( * ) Notice: Subject to any disclaimer, the term of this patent is extended or adjusted under 35 U.S.C. 154(b) by 1481 days.

(21) Appl. No.: 11/456,100

(22) Filed: Jul. 7, 2006

(65) Prior Publication Data

US 2008/0008803 A1 Jan. 10, 2008

(51) Int. Cl.
  A23L 1/36 (2006.01)
  A23L 1/20 (2006.01)

(52) U.S. Cl.
  CPC .............. *A23L 1/362* (2013.01); *A23L 1/2003* (2013.01); *A23L 1/36* (2013.01)

(58) Field of Classification Search
  USPC ....................................................... 426/632
  See application file for complete search history.

(56) References Cited

U.S. PATENT DOCUMENTS

| | | | |
|---|---|---|---|
| 2,643,190 A | 6/1953 | Hageman | |
| 2,926,091 A | 2/1960 | Riddle | |
| 3,457,087 A | 7/1969 | Renner et al. | |
| 3,645,752 A | 2/1972 | Baxley | |
| 3,740,236 A * | 6/1973 | Baxley | 426/270 |
| 4,049,833 A | 9/1977 | Gannis et al. | |
| 4,085,230 A | 4/1978 | Green | |
| 4,167,585 A | 9/1979 | Caridis et al. | |
| 4,206,246 A | 6/1980 | Mamahit | |
| RE30,651 E | 6/1981 | Green | |
| 4,329,375 A * | 5/1982 | Holloway et al. | 426/632 |
| 4,363,263 A | 12/1982 | Williams | |
| 4,436,757 A | 3/1984 | Lange et al. | |
| 4,504,502 A | 3/1985 | Earle et al. | |
| 4,515,820 A | 5/1985 | Tang | |
| 4,522,833 A | 6/1985 | Sharma | |
| 4,595,596 A | 6/1986 | Fazzolare et al. | |
| 4,597,973 A | 7/1986 | Moore | |
| 4,663,175 A | 5/1987 | Werner et al. | |
| 4,769,248 A | 9/1988 | Wilkins et al. | |
| 4,834,063 A * | 5/1989 | Hwang et al. | 126/21 A |
| 4,931,304 A | 6/1990 | Sharma | |
| 4,938,987 A * | 7/1990 | Gannis et al. | 426/632 |

(Continued)

FOREIGN PATENT DOCUMENTS

| CA | 1096694 A1 | 3/1981 |
|---|---|---|
| CN | 101283763 A | 10/2008 |

(Continued)

OTHER PUBLICATIONS

The Grinning Planet (published Jan. 11, 2005).*

(Continued)

*Primary Examiner* — Patricia George
(74) *Attorney, Agent, or Firm* — Fitch, Even, Tabin & Flannery LLP (57) ABSTRACT

Process for making crunchy flavorful nut products comprising contacting raw nuts with a water source effective to moisten the nuts without immersing the nuts in the water source, and roasting the moistened nuts. The nut products are crunchy and retain nut flavor when processed in this manner.

18 Claims, 2 Drawing Sheets

(56) References Cited

U.S. PATENT DOCUMENTS

| | | | |
|---|---|---|---|
| 5,002,802 | A | 3/1991 | Gannis et al. |
| 5,061,499 | A | 10/1991 | Holloway, Jr. et al. |
| 5,094,874 | A | 3/1992 | Zook |
| 5,164,217 | A | 11/1992 | Wong et al. |
| 5,194,278 | A | 3/1993 | Strong |
| 5,243,962 | A | 9/1993 | Hwang |
| 5,290,578 | A | 3/1994 | Passey et al. |
| 5,407,692 | A | 4/1995 | Caridis et al. |
| 5,433,961 | A | 7/1995 | Lanner et al. |
| 5,595,780 | A * | 1/1997 | Zook ............................ 426/632 |
| 5,718,936 | A | 2/1998 | Porter et al. |
| 5,939,119 | A * | 8/1999 | Cheng et al. ................... 426/302 |
| 5,960,703 | A * | 10/1999 | Jara et al. .......................... 99/331 |
| 6,572,907 | B1 | 6/2003 | Gorang et al. |
| 7,078,067 | B2 | 7/2006 | Latha et al. |
| 2004/0191395 | A1 | 9/2004 | Latha et al. |
| 2005/0089613 | A1 | 4/2005 | Nair |

FOREIGN PATENT DOCUMENTS

| | | |
|---|---|---|
| DE | 25 05 644 A1 | 8/1976 |
| DE | 10 2004 043 972 A1 | 3/2006 |
| EP | 0626811 B1 | 12/1997 |
| JP | 63-192355 A | 8/1988 |
| WO | WO-91/10372 A1 | 7/1991 |
| WO | WO-93/16609 A1 | 9/1993 |
| WO | WO-2004/066751 A1 | 8/2004 |

OTHER PUBLICATIONS

Cohen: Peanut Folklore; Feb. 17, 2005; http://web.archive.org/web/20051028092742/http://www.thenutfactory.com/kitchen/facts/facts-peanut.html.*

Patent Abstracts of Japan, Publ. No. 04020271 A, "Preparation of Seasoned Peanut", Jan. 23, 1992, 1 pg., JPO&Japio.

Patent Abstracts of Japan, Publ. No. 2001231478 A, "Method of Producing Roasted Peanut", Aug. 28, 2001, 1 pg., JPO&Japio.

Patent Abstracts of Japan, Publ. No. 2002209566 A, "Apparatus for Roasting With Superheated Steam", Feb. 23, 2002, 1 pg., JPO&Japio.

FSTA Database Abstract, AN 1989-09-Jz0131 from Peanut Science, 15, (1):18-21, 1988, recd. 1989, Authors: Branch, A. L., et al.

FSTA Database Abstract, AN 1991-12-Jz0176 from Journal of Agricultural & Food Chemistry, 37, (5):1377-1381, 1989, Authors: Chiou, R. Y. Y., et al.

FSTA Database Abstract, AN 2002-Js2894 from Journal of Science of Food & Agriculture, 82, (13):1465-1471, 2002, Authors: Adebiyi, A. P., et al.

* cited by examiner

FIG. 1

Figure 2

PROCESS TO ENHANCE FLAVOR OF ROASTED NUTS AND PRODUCTS WITH MODIFIED TEXTURE

FIELD OF THE INVENTION

This invention relates to food products and more particularly to roasted nuts and a process for modifying the texture of same while maintaining desired nut flavor to provide improved products.

BACKGROUND OF THE INVENTION

Production and trade in nuts for dietary use is a huge global industry. Nuts include a variety of tree nuts, plus peanuts, a legume. Nuts are used worldwide in large amounts by snack food manufacturers, confectioners, ice cream manufacturers, cereal manufacturers, bakers, chefs, cooks, and so forth. Roasted nut products are one of the popular types of nut products on the market. Roasted nuts are a savory source of dietary protein and fiber.

Previously, peanuts have been roasted using vegetable oil or hot dry air. U.S. Reissue Pat. No. Re. 30,651 discloses precooking peanuts in boiling water for 4 to 12 minutes before oil roasting. The roasted peanut product of U.S. Reissue Pat. Re. 30,651 were firm compared to roasted peanut products made without the preboiling step, but had perceptibly less peanut flavor than the original peanuts. Another prior process for roasting peanuts comprised applying a uniform coating of a gelatin solution to peanuts before dry roast. It produced a unique product with added flavor, but the amount of water absorbed into peanuts was limited in that process.

There is a need for improved processes for making roasted nut products which can yield crunchy nut products that retain nut flavor. As will become apparent from the descriptions that follow, the invention addresses this need as well as providing other advantages and benefits.

SUMMARY OF THE INVENTION

The invention provides a process for making crunchy flavorful nut products in which raw nuts are contacted with a water source under controlled conditions to moisten the nuts without immersing the nuts in the water source, and the moistened nuts are roasted to provide improved nut products. The nuts absorb water during the moistening treatment, and the nuts swell into larger volume structures that are maintained through roasting and result in a lower density that is permanently preserved in the roasted product. Preferably, the nuts are exposed to a saturation amount of water during the wetting treatment prior to roasting. This process reduces or eliminates loss of flavor-forming compounds and molecules from the nuts that otherwise would tend to occur if the nuts are submerged, and soaked or boiled in water prior to roasting, while providing for increased retention of nut cell structure and increased product crispness.

In one embodiment, the nuts are moistened by applying a water source to the nuts effective to moisten the nuts without immersing them, in conjunction with tumbling the moistened nuts in a revolving coating drum. The water source may comprise liquid water or high humidity air such as superheated steam. Liquid water is applied onto the nuts in a manner effective to moisten the nuts without creating any pooled water which may immerse the nuts. The temperature of the liquid water is not limited and may be cold, warm or hot. Room temperature water (e.g., about 60 to about 80° F.) can be used effectively in the practice of this embodiment. Heated water (e.g., about 81 to about 212° F.) may soak into the some nuts more rapidly, but is not required and can be substituted with room temperature water, e.g., tap water, to simplify the process and reduce production costs. After moistening, the nuts may be roasted using conventional roasting techniques, such as by oil roasting or dry air roasting.

In another embodiment, the nut surfaces are contacted with high humidity air while the nuts are conveyed through a chamber on an air/water vapor pervious conveyor in a gaseous atmosphere having a humidity of at least about 50%, particularly at least about 65%, more particularly at least about 75%, and most particularly at least about 90%. Preferably the gaseous atmosphere of the chamber has a humidity of at least about 75%. In this manner, moistening and roasting can be done in a single step. In a further embodiment, the moistened nuts are conveyed through a cooling chamber after being contacted with high humidity air in a preceding process chamber to rapidly cool the heated nuts and halt the roasting process.

The processes of the present invention are generally applicable to all types of raw nuts. The starting raw nut materials of the process of the present invention are nuts that are shelled. The raw nuts may have skins or alternatively may be skinless at the time of the wetting treatment of the present invention. Some shelled nuts are skinless such as cashews, while other shelled nuts, such as peanuts and almonds, have skins. If the nuts have skins when subjected to the wetting treatment, the skins tend to become loose and may be undesirable in the final roasted product from an aesthetic or marketing standpoint. However, from a technical standpoint, the presence of skins does not hinder the effective use of the wetting treatment of the present invention. If not skinless as shelled, the raw nuts may be optionally mechanically dry blanched to remove skins prior to being subjected to the wetting treatment of the process of the invention. The raw nuts may comprise legume nuts or seeds, such as peanuts, or alternatively nut precursors such as soy beans which can be formed into soy nuts by the processes of the present invention. Alternatively, the processes of the present invention may be applied to tree nuts and seeds, such as almonds, pistachios, cashews, hazel nuts, filberts, macadamia nuts, brazil nuts, and pine nuts. Mixtures of these different types of nuts may be combined before or after the moistening and roasting treatments of processes according to the present invention. If different types of nuts are combined before the moistening treatment, consideration must be given to the possibility that the different kinds of nuts may have different water absorption characteristics, which may complicate the procedure.

The crunchy flavorful nut products of the processes of the present invention also represent unique food products.

DETAILED DESCRIPTION OF THE PREFERRED EMBODIMENTS

Figure 1:
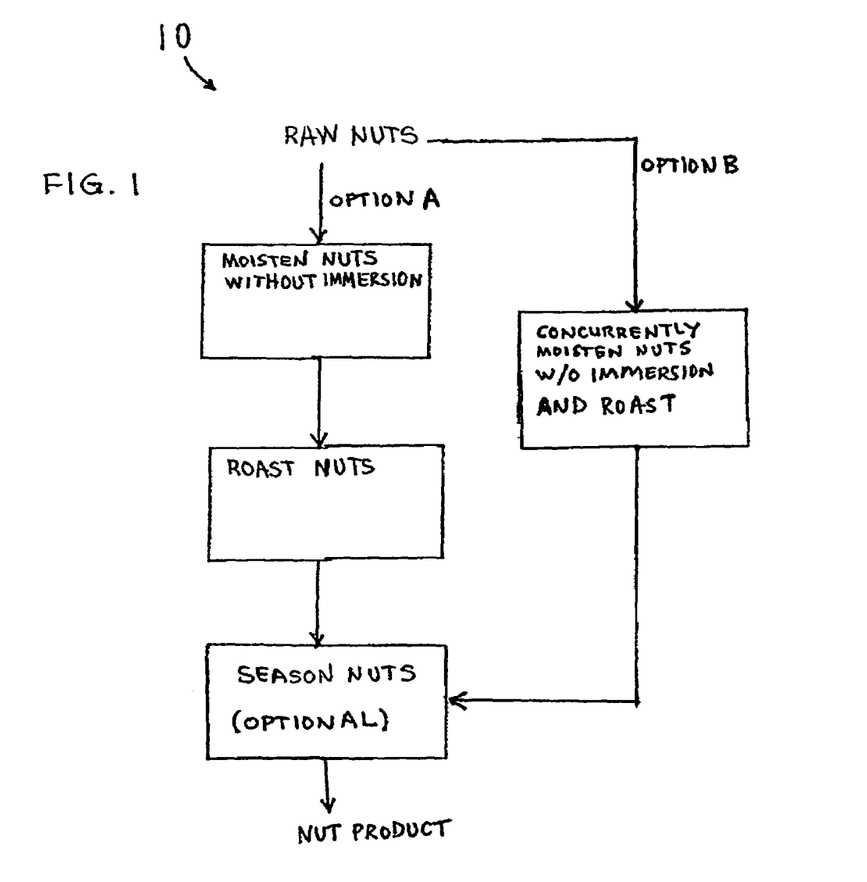
FIG. 1 is a flow chart of a process for providing crunchy flavorful nuts according to embodiments of the invention.

Referring to FIG. 1, a general process 10 is shown including Option A and Option B processing routes for providing crunchy flavorful nuts from raw nuts according to embodiments of the invention. The moistening and roasting steps can be performed sequentially (Option A) or concurrently (Option B) in embodiments of the present invention. The term "raw nuts" as used herein refers to unroasted edible nuts or seeds obtained from tree or legume plant sources in the form in which they are subjected to the wetting step of the process of the invention irrespective of any preliminary treatment which has been applied to the nuts other than aqueous soaking or boiling. The raw nuts of the present invention are not presoaked or boiled as that would cause loss of flavor compounds and lead to a roasted nut product having less satisfactory overall nut flavor.

The starting material for processes of this invention are shelled nuts. Although not required, dry blanching, a mechanical process, preferably is used to remove or loosen skins from nuts having skins, such as almonds, filberts, hazel nuts, and peanuts, prior to the nut wetting treatments provided in embodiments of the present invention. If skins are left on the nuts during treatment, the skins tend to become loose and may be undesirable in the final roasted product from an aesthetic or marketing standpoint. However the presence of skins does not hinder the effective use of the wetting treatment of the present invention. Water blanching, or any other treatment necessitating full water submersion of nuts, is generally not desirable and omitted from the practice of the present invention as it increases opportunities for flavor and flavor-forming compounds to be lost from the nuts into the soaking fluid prior to roasting the nuts.

The nuts which are treated in accordance with this invention can be any edible nuts or nut precursors which are conventionally packaged and sold as snack-type products or which are utilized for decoration or as fillers in the confectionery and baked foods industries. The raw nuts may comprise legume nuts such as peanuts, or alternatively nut precursors such as soy beans which can be formed into soy nuts by processes of the present invention. The peanuts that can be used include, e.g., Virginia, Runners, and Spanish types, individually or in combinations thereof. Also, the processes of the present invention may be applied to tree nuts, such as almonds, pistachios, cashews, hazel nuts, filberts, macadamia nuts, brazil nuts, pine nuts. Combinations of different nuts optionally may be used, although different kinds of nuts may have different water absorption characteristics which should be taken into account in determining the amount of water to be added to moisten the nuts. The raw nuts that can be processed according to the present invention are not particularly limited, other than excluding presoaked or boiled nuts. The practice of the invention can be applied to shelled whole nuts and/or pieces thereof.

In the present invention, it has been discovered that roasting nuts under higher moisture conditions provides for increased retention of nut cell structure and increases product crispness. Also, it has been observed that the nuts absorb water during the moistening treatment of the present invention, and the nuts swell into larger volume structures that are maintained through roasting and result in lower density permanently preserved in the roasted product. The unique processes of the present invention provide for modifying roasted nut texture and retaining the roasted nut flavor. The texture of the roasted nut products of this invention is crunchy but not unduly firm to require a very hard bite between opposed teeth in order to achieve the crunch. This improvement is achieved by incorporating a wetting treatment of nuts (using cold water, hot water, or high humidity air (e.g. superheated steam)) without immersion thereof before oil or dry roasting (Option A). Alternatively, as a single step, nuts are roasted nuts in a high humidity, heated air environment to produce improved roasted nuts (Option B). Both processes provide crunchier and also tastier roasted nuts.

In more detail, process Option A can be practiced using a batch coating device, continuous coating device, or conveyor to wet the nuts. For example, using tumbling action during wetting, the water and any flavorant contained therein may be coated onto the surface of the nuts.

Panning is a common method of coating nuts in chocolate or compound coating. In the present invention, panning may be used for directly coating nuts with water or an aqueous solution prior to roasting. This panning process is referred to herein as a "wet panning" process. In one embodiment, shelled, dry blanched nuts are placed in a revolving coating pan, drum or cylinder with its longitudinal axis aligned at a small angle to the horizontal with the entry port at the elevated end and introduction may be performed either manually or via automated equipment. In a larger scale operation, use of spray equipment directed at the nuts in the pan may be preferable for introducing the doses of water into the pan. Care should be taken to apply the water primarily onto the rotating nuts, and not onto the walls of the pan. As the nuts tumble, the introduced doses of water will become absorbed at nut surfaces. The tumbled nuts are kept freely flowing during the wettening procedure. Once a metered amount of water is absorbed, another metered amount may be introduced to the nuts in the coating pan. The panner will know visually and by the sound of the tumble when the nuts are ready for another application of water. Alternatively, an amount of water pre-calculated to saturate the nuts can be added as a single quantity onto the nuts as they are tumbled. The nuts will continue to be tumbled until all the water becomes absorbed. Since the nuts are being constantly tumbled within the pan, they will not become submerged in standing water and thus minimizes possible loss of flavoring compounds from nuts into free water. The moistened nuts are discharged from the coating pan and held until the moistened nuts equilibrate. After the waiting period (generally about 15 to about 30 minutes), the moistened nuts are roasted.

Although not needed to provide robust nutty flavor, diverse flavors optionally may be added into the water during the wetting process to create a modified overall taste in the product nuts. For example, smoky, sugary (sweet), spicy, lime, salty, or other flavorings, as well as combinations of flavor, may be dissolved or dispersed in the water used to moisten the nuts.

In a general embodiment, the multi-step pan wetting and roasting treatment of Option A may be performed by introduction of 10 to 20 lbs. water per 100 lbs. nuts; mixing the wetted nuts in the coating pan; and after waiting 20 to 60 minutes; roasting the pre-wetted nuts; cooling the nuts; and seasoning (if desired) and packaging the nut product.

Roasting of the prewetted nuts can be done in any conventional manner appropriate for the type of nuts being roasted. For example, the nuts may be oil roasted in a vegetable oil, such as peanut oil, at a temperature and for cooking period typically used for the particular type of nut being treated. Nuts may be oil-roasted in a batch cooker, or a continuous cooker that takes a steady stream of nuts through hot oil for about five minutes or other suitable residence time. After draining, the nuts may be seasoned, e.g., salted and oiled, evenly.

Alternatively, the nuts may be dry roasted. The nuts may be air roasted at temperatures and times which will vary depending upon the particular roasting temperature employed, the particular type of nut being processed, and the degree of roasting desired. For example, the time and extent of roasting will be greater in the case of peanuts than in the case of cashews. The most appropriate roasting conditions to be adopted in any particular instance are apparent to the skilled artisan or can be determined readily by a process of trial and error. An air roasting operation can be conducted on a batch or continuous basis. The nuts may be cooked in a large oven by dry, hot forced air after which seasonings may be applied.

In the case of a continuous air roasting operation, the nuts are placed on a continuous air/water vapor pervious belt and transported through a roasting oven heated to a temperature in the above range. The residence time of the nuts in the oven is adjusted to provide the desired time of roasting. Any apparatus conventionally employed in the art to effect dry roasting of nuts can be utilized in the above batch or continuous roasting step. Advantageously, the cooling of the nuts, generally to a temperature of less than 100° F., is accomplished in a relatively short period of time, about 5 minutes or less, to avoid continuation of the roasting process after the nuts have emerged from the roasting oven. Prior to or during cooling, the nuts may be agitated to ensure separation for the best results.

The dry-roasted nuts which result from the above combination of steps may thereafter be seasoned and packaged in any appropriate manner for marketing. The seasoning mix coated on the roasted nuts may be of any composition suitable for providing the nuts with the flavor desired. Preferably, the seasoning mix comprises salt, starch, sugar, and/or oil. The starch, if used, used in the seasoning mix is preferably corn starch. Monosodium glutamate also may be included in the seasoning mix as a flavor enhancer. Preferably, the seasoning mix may also be comprised of an additional flavor enhancer comprising a spice mix to provide the desired flavor to the nuts. A suitable spice mix may include gelatin, yeast, dried corn syrup, allspice, cinnamon, clove, carroway, bay, sage, ginger, basil, paprika and other spices, raw flavor, garlic powder and onion powder, in any suitable combination. Preferably, the seasoning mix may be applied to the nuts at a rate of about 1 to about 30 parts by weight of seasoning mix per 100 parts by weight of nuts.

The roasted nuts may be packed in containers ranging in size from single snack size bags, to large cans and jars. The roasted nuts also may be mixed with other nuts and/or dried fruits for snack foods or introduced as pieces in food compositions.

In the practice of Option B of the process of the invention, the nuts are moistened and roasted in a single operation by exposing the nuts to high humidity, heated air conditions. These roasted nuts are cooled, optionally seasoned, and packaged.

In a general embodiment, the single step high humidity roasting treatment of Option B may be performed in a food treatment chamber at 325° F. to 400° F. at an air humidity of 50% to 90%, particularly about 70 to 80%, moisture for a total residence time of about 5 to about 10 minutes; cooling the nuts, and then optionally seasoning and packaging the nut product.

The roasting hot air is provided with high humidity air, such as superheated steam vapor, such that the nuts may be evenly roasted and the moisture content reduced to less then 2% after cooling. The nut surfaces may be contacted with steam or superheated steam while the nuts are conveyed through a chamber on a pervious conveyor in a gaseous atmosphere having a humidity of at least about 50%, particularly at least about 65%, more particularly at least about 75%, and most particularly at least about 90%. Preferably the gaseous atmosphere contains at least about 75% humidity. In this manner, moistening and roasting of the nuts can be done in a single operation.

The continuous flow of roasted nuts emerging from the roasting zone preferably is carried by a continuous belt conveyor or like conveying means and transferred immediately to an adjoining cooling chamber or zone in which the temperature of the nuts is reduced rapidly, illustratively within a period of about 5 minutes and preferably less than about 2 minutes, to a temperature below about 100° F. This operation serves to terminate roasting of the heated nuts emerging from the high humidity heating chamber and ensure that excessive roasting of the nuts does not occur. This latter zone advantageously comprises a closed or partially closed area through which air or inert gas, at temperatures of about 100° F. or less, is caused to flow at a rate sufficient to achieve the desired reduction in temperature of the nuts. The efficiency of this cooling step is greatly enhanced by transporting the nuts through the cooling zone on a conveyor belt which is perforated to permit passage of cooling air or inert gas. A particularly preferred embodiment employs a continuous wire mesh belt conveyor permitting maximum contact between cooling gas and the nuts. The nuts may be agitated by a horizontal mechanical mixer as they are being transferred from the roasting zone to the cooling zone or within the cooling zone.

Food treatment ovens having steam heating and cooling zones which may be adapted for use in practicing the Option B process include, e.g., cooking devices commercially manufactured by Heat & Control, Inc., Hayward Calif., and Stein, Inc., Sandusky Ohio.

The stream of dry-roasted nuts emerging from the cooling zone is then optionally seasoned, such as in the manners described above, and then collected and transported by any appropriate means to a packaging station (not shown) where packaging of the nuts by any appropriate and conventional means is accomplished or to an appropriate storage facility.

Sensory evaluations have shown that these nut products of the present invention have more crunch and better flavor than roasted nuts which have been preboiled.

The examples that follow are intended to further illustrate, and not limit, embodiments in accordance with the invention. All percentages, ratios, parts, and amounts used and described herein are by weight unless indicated otherwise.

EXAMPLES

Example 1

Twenty pounds of dry blanched peanuts (Runners) were added into a Cretors® coating tumbler (45° pan tilt angle, 28 rpm pan rotation speed). Fifteen hundred grams (total) of cold water (approx. 75° F.) was slowly added during tumbling in metered amounts (approx. 500 gram portions added at approximately 10 minute intervals) over a time period of approximately 30 minutes in a manner to effect wetting surfaces of the peanuts and such that no immersion of the nuts occurs. When the water was absorbed by the peanuts, the next dose (if any remaining) of water was introduced. Peanuts were not immersed or submerged in water. This treatment is referred to herein as a "wet pan" treatment. After adding all of the water, the wetted peanuts were discharged from the coating pan and oil roasted at 340° F. for 4 minutes. The roasted peanuts were cooled to about 100° F., and dressing oil and salt were added in typical proportions to the roasted nuts. As a control, a separate sample of the dry blanched peanuts was oil roasted under similar conditions without being subjected to the prewetting treatment. The moisture-pretreated, oil roasted peanuts had crisper texture than the comparison roasted peanuts prepared without the prewetting treatment, and had good roasted peanut taste.

Example 2

Additional samples of dry blanched peanuts (Runners) were subjected to a wet pan treatment similar to Example 1 except using the modified conditions detailed below.

As one additional sample, 3 lbs. water was added in a single addition to 16 lbs. peanuts as they were tumbled; the wetted nuts were tumbled and mixed in the coating pan for an additional 30 minutes; then the pre-wetted nuts were oil roasted at 340° F. for 4 minutes, and then cooled.

In yet another sample, 4 lbs. water was added in a single addition to 24 lbs. peanuts as they were tumbled; the wetted nuts were tumbled and mixed in the coating pan for an additional 20 minutes; then the pre-wetted nuts were oil roasted at 340° F. for 4 minutes, and then cooled.

In all these additional samples, the roasted nut products were crunchy and retained a rich peanut flavor.

Example 3

Dry blanched peanuts (Runners) were moistened and roasted with high humidity, heated air at 350° F. and 75% humidity for a residence time of 7 minutes in a single stage operation. This operation was performed in a food treatment oven equipped with a vapor pervious conveyor, which transported the peanuts through a treatment chamber in which a stream of heated process vapor was circulated along the conveyor. The peanuts were substantially evenly spread in an unpiled manner upon the conveyor. The roasted nuts were discharged from the treatment chamber into a cooling chamber where they were allowed to equilibrate. The food treatment oven was commercially manufactured by Heat & Control, Inc., Hayward Calif. After cooling the roasted peanuts, standard dressing oil and salt was added to the roasted nuts. The product obtained was seasoned, dry roasted peanuts with crispy texture and enhanced roasted peanut taste.

Example 4

Additional samples of peanuts (Runners) were subjected to the single step moistening and roasting operation of Example 3 except using the modified conditions detailed below.

In one sample, high humidity roasting was performed at 325° F. and 70% humidity for a total residence time of 10 minutes, and then cooled.

In another sample, high humidity roasting was performed at 350° F. and 75% humidity for a total residence time of 7 minutes, and then cooled.

In another sample, high humidity roasting was performed at 375° F. and 75% humidity for a total residence time of 5 minutes, and then cooled.

In all these additional samples, the roasted nut products were crunchy and retained a distinct peanut flavor.

Example 5

The effect of the wet pan treatment on roasted peanuts (Runners) was compared to presoaked or preboiled comparison samples, and also a non-moistened control sample.

The following Table 1 indicates the pre-roasting process parameters and conditions for the control (1), comparison samples (2-7) and wet panned sample (8). The wet panned sample of peanuts was wetting using the same type of nuts and process conditions of Example 1 above. Sensory evaluation results for these samples are also described in Table 1.

TABLE 1

| Sample | Process/Temp., ° F. | Time Min. | Hardness, 1st bite molars | Crunchiness, 2–3 chews | Overall peanut flavor |
|---|---|---|---|---|---|
| 1 | none | — | 8.5 | 6.8 | 5.8 |
| 2 | Soak, 140° F. | 3 | 8.8 | 7.6 | 5.1 |
| 3 | Soak, 140° F. | 10 | 9.2 | 8 | 5 |
| 4 | Soak, 140° F. | 30 | 9.3 | 8.2 | 4.9 |
| 5 | Soak, 140° F. | 60 | 9.5 | 8.4 | 4.9 |
| 6 | Boil, 212° F. | 3 | 8.9 | 7.7 | 5.1 |
| 7 | Boil, 212° F. | 10 | 8.5 | 7.2 | 5.1 |
| 8 | Wet Panned | 8.5 | 8.9 | 7.7 | 5.2 |

For the sensory evaluations performed, eight trained panelists evaluated all eight samples in a randomized sequential monadic presentation. Two replications were presented to each panelist. A 0-15 scale was used for panelists to qualitatively rate the hardness (i.e., 0=soft, 15=hard), crunchiness (i.e., 0=not crunchy, 15=very crunchy), and overall peanut flavor (i.e., 0=none, 15=much) of the samples. "Hardness" was determined as the force required to bite completely through the sample between the molars (soft-hard) using one whole peanut. "Crunchiness" was determined as the degree to which the sample sounds crunchy (not crunchy-very crunchy) using one whole peanut. "Overall Peanut Flavor" was determined as the total of all aromatics associated with peanuts (roast, woody, hulls, skins) with reference to dark roast peanut paste (Scale Value: 7.0).

The mean values are reported in Table 1. ANOVA/Tukeys was used to statistically analyze the data. P-values were less than 0.0001 for the hardness, crunchiness, and overall peanut flavor results.

As to the sensory evaluation results, the wet panned nuts of Sample 8 were the only nuts that retained overall nutty flavor and crunchiness. The presoaked and preboiled nuts may have increased the hardness and crunchiness, but the overall peanut flavor had been noticeably decreased in the presoaked and preboiled nuts as compared to the wet panned nuts. Comparison Sample 5 provided high hardness and crunchiness intensities but delivered the lowest overall peanut flavor. Control Sample 1 had high peanut flavor but also had the lowest hardness and crunchiness intensities.

Figure 2:
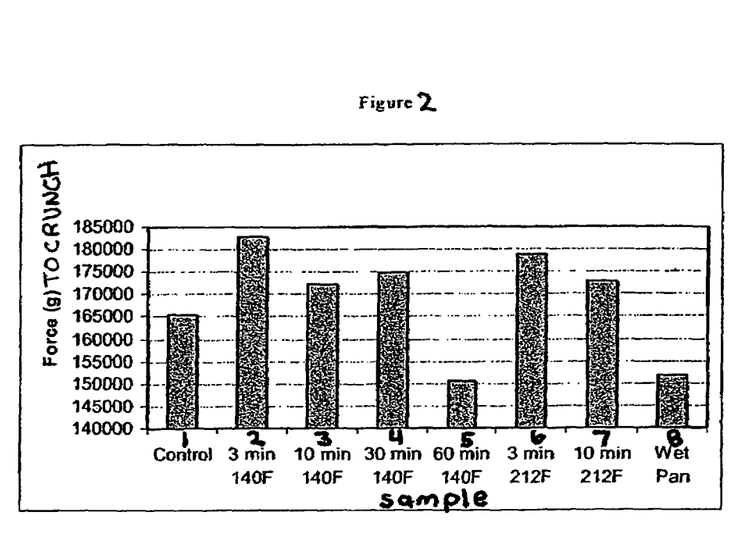
FIG. 2 is a bar graph showing results of measurements of the force to crunch for control, comparison, and inventive nuts made in accordance with embodiments herein, as measured on a texture analyzer.

To quantitatively evaluate the texture of the tested nuts, the force to crunch parameter of each sample of nuts was measured in grams force on a TAX.T2 Instron texture analyzer. The results are shown in FIG. 2. Ideally, the roasted nut would provide a good crunch without requiring excessive biting down force. As shown in the results of FIG. 2, the wet panned nuts of Sample 8 yielded a significant crunch at a low required biting force, as compared to the control and comparison nuts.

Example 6

The effect of the wet pan treatment on roasted peanuts (Runners) was compared to commercial roasted peanut products. Commercial product "A" was obtained as a commercial roasted and salted peanut product of a different manufacturer. Samples of Planters® Dry Roasted Lightly Salted Peanuts ("RP") and Planters® Cocktail Peanuts ("CP") also were evaluated for comparison purposes.

The wet panned sample of peanuts ("wet panned") was wetted using the same type of nuts and process conditions of Example 1 above. Sensory evaluations were performed for these samples and the results of which are described in Table 2 (all as mean values).

TABLE 2

| | Sample | | | |
|---|---|---|---|---|
| Characteristic | Commercial product A | Wet Panned | RP | CP |
| Sweet | | | | |
| Value (Mean) | 1.89 | 2.13 | 1.79 | 1.82 |
| Bitter | | | | |
| Value (Mean) | 1.87 | 1.69 | 1.86 | 1.71 |
| Overall Peanut Flavor | | | | |
| Value (Mean) | 5.95 | 6.97 | 6.26 | 6.15 |
| Roasted | | | | |
| Value (Mean) | 5.64 | 6.32 | 5.69 | 5.67 |
| Raw/Beany | | | | |
| Value (Mean) | 1.65 | 0.60 | 1.78 | 1.64 |
| Hardness (1st bite - molars) | | | | |
| Value (Mean) | 5.74 | 6.82 | 5.41 | 5.66 |
| Fracturability (1st bite - molars) | | | | |
| Value (Mean) | 5.41 | 6.50 | 5.15 | 5.55 |
| Crunchiness (1–2 chews - molars) | | | | |
| Value (Mean) | 5.41 | 7.06 | 5.38 | 5.62 |

For the sensory evaluations performed, eleven trained panelists evaluated both samples in a randomized sequential monadic presentation. In evaluating sweet and bitter flavor of the nuts, three whole nuts of each sample were assessed as follows. Panelists used a 0-15 scale (none—much) to indicate their perceived intensities per attribute. "Sweet" was the perception of sweet in the mouth (0=none, 15=much); Reference: Sweet Solution 2 & 5. "Bitter" was the perception of bitter in the mouth (0=none, 15=much); Reference: Bitter Solution 2 & 5. "Overall Peanut Flavor" (0=none, 15=much) was determined as the total of all aromatics associated with peanuts (roast, woody, hulls, skins) with reference to dark roast peanut paste (Scale Value: 7.0). "Roasted" property was the aromatic property associated with roasted nutmeat and having a browned or toasted character; Reference: roasted peanut paste (Scale Value: 4.0). "Raw/Beany" was the aromatic property associated with legumes and unroasted peanuts; Reference: Edamame (thawed) (Scale Value: 3.5). As to texture evaluations performed, "Hardness" was determined as the force required to bite completely through the sample between the molars (soft-hard) using one whole peanut (0=soft, 15=hard). "Fracturability" was the force in which the product breaks or shatters on initial bite using one whole peanut (Not Fracturable (0) to Very Fracturable (15)). "Crunchiness" was determined as the degree to which the sample sounds crunchy (not crunchy (0) to very crunchy (15)) using one whole peanut.

As the results in Table 2 show, the wet panned peanuts had significantly higher overall peanut and roasted flavor, and lower raw/beany flavor compared to the commercial peanut products.

Example 7

The effect of the wet pan treatment in the production of roasted cashew products also was studied. 500 g of dry blanched cashews (India 240 variety) were added into a Cretors® coating tumbler (45° pan tilt angle, 28 rpm pan rotation speed). 56 grams (total) of cold water (approx. 75° F.) was slowly added during tumbling in metered amounts (approx. 20 gram portions) over a total time period of approximately 30 minutes in a manner wetting surfaces of the cashews with waiting periods of approximately 10 minutes after each dosing until all the water was absorbed by the cashews before the next dose of water was introduced. Cashews were not immersed or submerged in water at the water addition rate used. After adding all of the water, the wetted cashews were discharged from the coating pan and oil roasted at 310° F. for 4.5 minutes. The roasted cashews were cooled, and dressing oil and salt were added in typical proportions to the roasted nuts. As a control, a separate sample of the dry blanched cashews was oil roasted under similar conditions without being subjected to the prewetting treatment. As a further comparison sample, dry blanched cashews were boiled in water for about 3 minutes prior to roasting.

A group of trained panelists (7) in nut sensory properties evaluated the crunch and flavor of each sample of roasted cashews. Crunch note was rated by each panelists on a scale of 1 to 5 with 1 corresponding to "no crunch" and 5 corresponding to "very crunchy". Flavor note was rated by each panelists on a scale of 1 to 5 with 1 corresponding to "very low flavor" and 5 corresponding to "very high flavor". The panelists scores for the crunch and flavor notes were averaged for each type of sample that was evaluated, and the results thereof are provided in Table 3 below.

TABLE 3

| | Tree Nuts Sample | | |
|---|---|---|---|
| Property | Control | Comparison (Boiled) | Wet Panned |
| Crunch | 1.6 | 3.6 | 3.3 |
| Flavor | 3.1 | 1.3 | 3.7 |

The results for these studies on cashews show that the wet pan treatment according to an embodiment of the present invention increased the crunch while maintaining cashew flavor while the control sample had inferior crunch as compared to the wet panned sample, and the boiled (comparison) sample had inferior flavor as compared to the wet panned sample. The wet panned roasted cashew samples made according to the present invention yielded a uniquely textured and distinct product.

While the invention has been particularly described with specific reference to particular process and product embodiments, it will be appreciated that various alterations, modifications and adaptations may be based on the present disclosure, and are intended to be within the spirit and scope of the present invention as defined by the following claims.

What is claimed is:

1. A process for making nut products, comprising:
   contacting unroasted raw nuts with water, the unroasted raw nuts selected from the group consisting of—tree nuts, legume nuts, and seeds, and the unroasted raw nuts having a density and an amount of flavor-forming compounds including oils, the water effective to moisten the raw nuts without immersing the raw nuts in the water, the raw nuts and water in a weight ratio of water to raw nuts ranging from about 1:10 to about 2:10 effective to swell the raw nuts to an increased volume while retaining the amount of flavor-forming compounds including oils from the unroasted raw nuts, wherein the contacting includes applying the water in metered amounts to the raw nuts effective to moisten but not immerse the raw nuts while tumbling;

holding the moistened nuts for about 15 to about 60 minutes, the holding effective to equilibrate moisture within the moistened nuts while maintaining an elevated moisture level and the increased volume; and roasting the moistened nuts with the elevated moisture level effective to maintain the increased volume to provide a less dense nut.

2. The process of claim 1, wherein said contacting comprises tumbling the raw nuts in an amount of liquid water having temperature of about 60 to about 80° F. effective to saturate the nuts.

3. The process of claim 1, wherein the water source comprises liquid water.

4. The process of claim 1, wherein the moistened nuts are conveyed through a cooling chamber after the contacting and prior to the roasting.

5. The process of claim 1, wherein the raw nuts comprise peanuts.

6. The process of claim 1, wherein the raw nuts comprise dry blanched peanuts.

7. The process of claim 1 wherein the raw nuts comprise tree nuts selected from the group consisting of almonds, pistachios, cashews, hazel nuts, macadamia nuts, brazil nuts, and pine nuts.

8. The process of claim 1 wherein the raw nuts comprise dry blanched almonds.

9. The process of claim 1 wherein the raw nuts comprise dry blanched hazel nuts.

10. The process of claim 1 wherein the raw nuts comprise cashew nuts.

11. The process of claim 1, wherein roasting comprises oil roasting.

12. The process of claim 1, wherein roasting comprises dry air roasting.

13. A nut product, comprising the product of contacting unroasted raw nuts with water to provided moistened nuts, the unroasted raw nuts selected from the group consisting of tree nuts, legume nuts, and seeds having a cell nut structure, a density, and an amount flavor-forming compounds, including oils, the water in an amount effective to moisten the raw nuts without immersing the raw nuts in the water, the water and raw nuts in a weight ratio of water to raw nuts ranging from about 1:10 to about 2:10 effective to swell the raw nuts to an increased volume relative to the cell nut structure of the unroasted raw nuts and to retain in the moistened nuts the amount of flavor-forming compounds including the oils of the unroasted raw tree nuts, legume nuts, or seeds and roasting the moistened nuts effective to maintain the increased volume, to provide a less dense nut, and to provide the nut product that has retained the flavor-forming compounds, including the oils, of the unroasted raw tree nuts, legume nuts, or seeds, wherein prior to roasting, the moistened nuts are held for about 15 to about 60 minutes effective to equilibrate moisture within the moistened nuts while maintaining an elevated moisture level and the increased volume and while substantially retaining the flavor-forming compounds of the unroasted tree nuts, legume nuts, or seeds.

14. The nut product of claim 13, wherein the raw nut is selected from the group consisting of peanuts, soy beans, almonds, pistachios, cashews, hazel nuts, macadamia nuts, brazil nuts, pine nuts, and combinations thereof.

15. A process for making a nut product, comprising:

contacting unroasted raw nuts with water, the unroasted raw nuts selected from the group consisting of tree nuts, legume nuts, and seeds, the unroasted raw nuts having a cell nut structure, a density and an amount of flavor-forming compounds including oils, the water effective to moisten the raw nuts, without immersing the raw nuts in the water, the raw nuts and water in a weight ratio of water to raw nuts ranging from about 1:10 to about 2:10, wherein the contacting includes applying the water in metered amounts to the raw nuts effective to moisten but not immerse the raw nuts while tumbling;

holding the moistened nuts for about 15 to about 60 minutes, the holding effective to equilibrate moisture within the moistened nuts while maintaining an elevated moisture level and the increased volume; and roasting the moistened nuts with the elevated moisture level to maintain the increased volume.

16. The process of claim 15, wherein said contacting comprises tumbling the raw nuts in an amount of liquid water having temperature of about 60 to about 80° F. effective to saturate the nuts.

17. The process of claim 16, wherein the water source comprises liquid water.

18. The process of claim 17, wherein the moistened nuts are conveyed through a cooling chamber after the contacting and prior to the roasting.

* * * * *

UNITED STATES PATENT AND TRADEMARK OFFICE
CERTIFICATE OF CORRECTION

| | | |
|---|---|---|
| PATENT NO. | : 9,078,467 B2 | Page 1 of 1 |
| APPLICATION NO. | : 11/456100 | |
| DATED | : July 14, 2015 | |
| INVENTOR(S) | : Theresa R. Cea et al. | |

It is certified that error appears in the above-identified patent and that said Letters Patent is hereby corrected as shown below:

IN THE CLAIMS:

Claim 1, Column 10, Line 58; delete "of--tree" and insert --of tree--.

Claim 17, Column 12, Line 41; delete "claim 16" and insert --claim 15--.

Claim 18, Column 12, Line 43; delete "claim 17" and insert --claim 15--.

Signed and Sealed this
Twelfth Day of January, 2016

Michelle K. Lee
*Director of the United States Patent and Trademark Office*